United States Patent [19]  [11] 4,246,183
Knifton  [45] Jan. 20, 1981

[54] PROCESS FOR PREPARING UNSATURATED ALIPHATIC ESTERS FROM ALIPHATIC DIENES

[75] Inventor: John F. Knifton, Austin, Tex.

[73] Assignee: Texaco Development Corp., White Plains, N.Y.

[21] Appl. No.: 46,747

[22] Filed: Jun. 8, 1979

[51] Int. Cl.$^3$ ............ C09F 5/08; C11C 3/02; C11C 1/00
[52] U.S. Cl. ............ 260/408; 260/410; 260/410.5; 260/410.6; 260/410.9 R; 260/413; 252/429 R; 252/431 R; 252/431 C
[58] Field of Search ............ 260/413 HC, 410.9 C, 260/408, 410 R, 410.5, 410.6; 562/244, 522; 252/431 C, 431 P, 429 R

[56] References Cited

U.S. PATENT DOCUMENTS 3,780,074  12/1973  Romanelli .......... 260/410.9 C
4,124,617  11/1978  Knifton .......... 260/410.9 C Primary Examiner—John F. Niebling
Attorney, Agent, or Firm—Carl G. Ries; Robert A. Kulason; James L. Bailey

[57] ABSTRACT

This invention relates to the selective production of fatty acid derivatives from aliphatic diene substrates such as 1,3-butadiene, in the presence of dual-function homogeneous palladium complexes and certain O-heterocyclic and S-heterocyclic solvents. Also effective are phosphorus-nitrogen-containing solvents.

9 Claims, No Drawings

PROCESS FOR PREPARING UNSATURATED ALIPHATIC ESTERS FROM ALIPHATIC DIENES

SUMMARY OF THE INVENTION

This invention concerns a process for preparing unsaturated aliphatic carboxylic acids and their ester derivatives from aliphatic conjugated dienes.

More specifically, this inventive process relates to the selective synthesis of linear unsaturated carboxylic (fatty) acids and their ester derivatives via the one-step dimerization, carbonylation of conjugated aliphatic dienes, such as 1,3-butadiene, in the presence of hydroxylated coreactants, homogeneous dual-function palladium catalysts and certain classes of solvents. The process is exemplified by, but not limited to, the one-step dimerization and carbonylation of 1,3-butadiene to 3,8-nonadienoic acid and its ether derivatives, according to the stoichiometry of eq. 1 below.

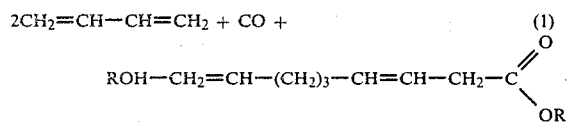

The inventive process, more fully described infra, has the advantages over the prior art* of ensuring improved palladium catalyst stability during the one-step dimerization and carbonylation of said conjugated diene substrates, improved selectivity to desired linear, unsaturated carboxylic acid/ester derivatives and improved rate of carbonylation versus competing diene dimerization.

*See J. Tsuji et al, Tetrahedron 28, 3721 (1972), W. E. Billups et al, J. C. S. Chem. Common. 1067 (1971).

The products, particularly the esters of linear carboxylic (fatty) acids are useful progenitors in the formulation of synthwetic lubricants and synthetic lubricant additives. Of particular value in these applications are the ester derivatives of said linear carboxylic (fatty) acids with polyols such as pentaerythritol, trimethylol propane and neopentyl glycol.

PROCESS EMBODIMENTS

In the broadest aspect of this invention, unsaturated carboxylic (fatty) acids/esters are prepared from aliphatic conjugated diene substrates by mixing said dienes, in a deoxygenated environment, with a catalytic amount of palladium catalyst precursor, a heterocyclic or phosphorus-containing solvent, hydroxylated co-reactant and carbon monoxide gas and heating said reaction mixture under superatmospheric pressures until the desired unsaturated carboxylic (fatty) acids/esters are formed.

In a narrower practice of this invention, unsaturated carboxylic (fatty) acids/esters* are prepared from aliphatic conjugated diene substrates by the catalytic dimerization, carbonylation of said conjugated dienes by a process comprising the following steps:
*The phase "acids/esters" throughout this application is interchangeable with the phase "acids or esters".

(a) Admixing each two moles of said aliphatic conjugated diene to be dimerized and carbonylated with (1) at least a catalytic quantity of a palladium catalyst precursor consisting of one or more palladium salts in combination with one or more Group VB tertiary donor ligands, and (2) at least a molar equivalent of a hydroxylated coreactant selected from the group consisting of water or an aliphatic alkanol containing 1 to 12 carbons, in the presence of a solvent selected from the classes of a O-heterocyclic solvent, an S-heterocyclic solvent, a mixed O,S-heterocyclic solvent and a phosphorous-nitrogen-containing solvent.

(b) Pressurizing said reaction mixture with sufficient carbon monoxide to satisfy the stoichiometry of eq.1.

(c) Heating said reaction mixture in the temperature range of 30° to 150° C. until substantial formation of desired unsaturated aliphatic carboxylic acid/ester is achieved, and isolating said unsaturated carboxylic (fatty) acid or acid derivative contained therein.

In order to present the inventive concept in the greatest possible detail as to promote its understanding the following supplementary disclosure is submitted:

A. Process Sequence and Variations—In general, the components of the aforementioned reaction mixture including solvent, hydroxylated co-reactant, aliphatic conjugated diene and palladium catalyst may be added in any sequence as long as sufficiently good agitation is provided to assure the formation of a homogeneous mixture. For example, the following represent some variations insofar as the catalyst, the sequence of CO added to the reaction mixture and heating that may be made without departing from the inventive process. These modifications include:

(1) The palladium catalyst precursor, consisting of one or more palladium salts in combination with one or more Group VB tertiary donor ligands, may be added to the reaction mixture as separate components. To minimize any stability problems with the homogeneous catalysts, it is preferable to add at least two molar equivalents of Group VB donor ligand, such as tri-n-butylphosphine or triphenylphosphine, for each molar equivalent of palladium salt. Optionally, however, a larger excess of Group VB donor ligand may be present before the reaction mixture is heated.

(2) A second variation is that the catalyst is preformed from the palladium salt and Group VB tertiary donor ligands, as described in the literature by Stephenson* and others, and then added to the reaction mixture as the preformed ligand-stabilized palladium salt, eg. bis(triphenylphosphine) palladium (II) acetate.
* T. A. Stephenson et al, J. Chem. Soc. 3632 (1965).

(3) A preferred modification of the procedure is that the palladium catalyst, preformed or prepared in situ, is solubilized in a mixture of the hydroxylated coreactant and solvent prior to the addition of the aliphatic diene, such as 1,3-butadiene, and carbon monoxide.

(4) A substantial process variation that can be employed is to heat the catalyst containing solution to temperature under an inert atmosphere, or a slightly elevated pressure of CO, and then to add the aliphatic diene and carbon monoxide, with efficient agitation, and to maintain the CO pressure in the reactor until the ester is formed.

(B) Homogeneous Palladium Catalyst Complex—The homogeneous palladium catalyst complex of this invention normally consists of at least two components. The first component is a palladium-containing salt, particularly the palladium salt of an organic acid such as palladium(II) acetate, palladium(II) formate, palladium(II) octanoate, palladium(II) propionate, and palladium acetylacetonate. Also suitable are palladium$\pi$-allylic complexes such as Pd($\pi$-allyl)(OAc)$_2$, palladium salts of mineral acids such as palladium(II) nitrate, palladium sulphate and palladium(II) halides such as palladium(II) chloride and palladium(II) bromide when added in combination with excess alkali or alkaline-earth acetates, such as sodium acetate, potassium acetate and calcium acetate.

The second critical component of this homogeneous palladium catalyst is the Group VB tertiary donor ligand. The key elements of these ligands, used to stabilize the palladium(II) salts, are selected from Group VB of the Periodic Chart of the Elements*. They include nitrogen, phosphorus, arsenic and antimony. These elements, in the trivalent oxidation state, particularly tertiary phosphorus, may be bonded to one or more alkyl, cycloalkyl, aryl, substituted aryl, aryloxide, alkyloxide and mixed alkaryl radicals, each containing at least 1 to 12 carbon atoms, or mixtures thereof. Illustrative of suitable ligands used to stabilize the palladium-(II) salts are: $P(C_6H_5)_3$, $As(C_6H_5)_3$, $Sb(C_6H_5)_3$, $P(CH_3)_2C_6H_5$, $P(iso-C_4H_9)_3$, $P(p-CH_3.C_6H_4)_3$, $P(c-C_6H_{11})_3$, $P(OC_6H_5)_3$, $P(p-CH_3.C_6H_4)(C_6H_5)_2$, $P(C_6H_5)_2[3,4-(CH_3O)_2C_6H_3]$, $P(CH_3)_3$, $P(C_2H_5)_3$, $P(n-C_4H_9)_3$, $P(C_8H_{17})_3$, $P(o-CH_3.C_6H_4)_3$, $(C_6H_5)_2As(CH_2)_2As(C_6H_5)_2$, $P(p-Cl.C_6H_4)_3$ and $P(C_8H_{17})_3$.

*Advanced Inoganic Chemistry, by F. A. Cotton and G. Wilkinson, 2nd Ed. 1966.

A preferred class of Group VB tertiary donor ligands, used in combination with palladium acetate salt, which ensures improved yields of desired unsaturated (fatty) acid/ester and improved palladium catalyst stability, consists of alkylphosphine ligands of pKa 6.0*, such as triethylphosphine, trimethylphosphine, tri-n-butylphosphine, tricyclohexylphosphine and tri-n-octylphosphine.

F. E. Paulik, Catalysis Reviews, 6, (1972).

The following are typical combinations of palladium salt and Group VB tertiary donor ligands which can be used in the catalytic dimerization, carbonylation of aliphatic dienes to their unsaturated carboxylic acid derivatives: $Pd(OAc)_2$—$2P(OPh)_3$; $Pd(OAc)_2$—$2P(O-Et)_3$; $Pd(OAc)_2$—$2P(p-Cl.C_6H_4)_3$; $Pd(OAc)_2$—$2PPh_3$; $Pd(OAc)_2$—$2P(p-CH_3.C_6H_4)_3$; $Pd(OAc)_2$—$2P(n-Bu)_3$; $Pd(OAc)_2$—$2P(c-C_6H_{11})_3$; $Pd(OAc)_2$—$2PEt_3$; $Pd(OAc)_2$—$P(o-CH_3.C_6H_4)_3$; $Pd(OAc)_2$—DIARS; $Pd(PPh_3)_2$—$(OAc)_2$; $Pd(NO_3)_2$—$2P(n-Bu)_3$; $Pd[PPh_2(3,4-CH_3O)_2-C_6H_3)]_2Cl_2$—10 NaOAc; $PdCl_2$—$2P(n-Bu)_3$—10 NaOAc; $Pd(Acac)_2$—$2P(n-Bu)_3$), and $Pd(OAc)_2$—$2P(C_8H_{17})_3$.

Generally, to achieve good yields of desired product and maximum palladium catalyst stability, at least one molar equivalent of Group VB tertiary donor ligand should be present per gram atom of palladium. Higher ratios are not deleterious however.

C. Ratio of Palladium Catalyst to Aliphatic Diene Substrate—Experimental work indicates that a molar ratio of up to 500 moles of diene per mole of palladium-(II) catalyst complex can be employed in most instances where the aliphatic dienes, typified by 1,3-butadiene, are used as the substrate. This molar ratio constitutes what is referred to as a catalytic amount. Much lower ratios (i.e., 25 moles of diene substrate per mole of platinum halide) are not harmful but are economically unattractive. For this reason the preferred molar range is from 50 to 400 moles of diene substrate per mole of palladium metal catalyst.

D. Solvents—The solvents useful here may be chosen from a wide variety of organic solvents falling within the basic class of oxygen(O—)containing heterocyclics, sulphur (S—)containing heterocyclics, mixed O-S-heterocyclics and phosphorus-nitrogen-containing solvents. Furthermore, the heterocyclic groups may contain nitrogen in addition to the oxygen and sulfur moieties.

Typical useful solvents here include heterocyclic ring systems containing 4 or more atoms for heterocyclic ring, as in the cases of:

(a) Oxygen-containing heterocyclic ring systems such as a cyclic ether, for example, tetrahydrofuran and tetrahydropyran; cyclic polyethers such as dioxolane, 1,3-dioxane, p-dioxane, trioxane, metaldehyde and benzodioxole; lactones such as 8-butyroacetone, and B-propiolactone; lactides and diketene, as well as acylic carbonates like ethylene carbonate and propylene carbonate.

(b) Suitable sulphur-containing ring heterocyclics, including cyclic thioethers such as tetrahydrothiophene, thiiran, benzothiophene and dibenofuran.

(c) Heterocyclic ring systems containing more than one kind of heteroation, including those containing sulphur and oxygen (the O-S-heterocyclics) such as 1,4-thioxane and propane sultone, as well as those containing nitrogen in addition to oxygen and sulphur moieties, as in the case of N-alkylmorpholines, N-alkyloxazolidines, 1,4-thioxane, isoxaxole and saltams like propane sultam.

Also effective as solvents for the palladium catalysts of this invention are phosphorus-nitrogen-containing solvents wherein in such solvents the materials contain one or more phosphorus-to-nitrogen bonds. Suitable examples of such solvents include amidophosphates such as the hexalkylphosphoramides like hexamethylphenphoramide, as well as certain haloamidophosphates, amidophosphate esters and arylamidophosphates.

The benefits resultant from the use of the above solvents are many and varied. They particularly tend to improve catalyst performance. For example, use of such solvents increase ester yield, basis butadiene charged. In addition such solvents tend to improve selectivity to the desired ester. In addition, there is noted a greater stability as measured by the percentage of palladium catalyst remaining in solution after completion of the synthesis. Lastly, there is noted an improved ratio of carbonylation products relative to less desirable diene oligomers also present in the product.

E. Operating Temperature—The temperature range which can be employed for ester formation is variable, dependent upon other experimental factors including the substrate employed, the pressure, the concentration and the particular choice of catalyst among other things. Again using butadiene as a typical conjugated aliphatic diene substrate and $Pd(Oac)_2$—$2[P(C_6H_5)_3]$ as a representative catalyst, the range of operability is from about 30° to 150° C. when superatmospheric pressures of CO are employed. A narrower range of 70° C. to 120° C. represents the preferred temperature range when the aforementioned conjugated diene is carbonylated using the catalyst system described supra.

F. Pressure—Superatmospheric pressures of 100 psig to at least 3000 psig lead to substantial conversion of the conjugated diene to the ester of unsaturated carboxylated acid at temperatures of 30° to 150° C. using $Pd(OAc)_2$—$2[P(C_6H_5)_3]$ as catalyst and butadiene as the substrate.

G. Reaction Times Required—As previously indicated in the analogous discussion on temperatures and pressures required in the reaction, experimental variables are important in arriving at reaction times. Generally, substantial conversions (70% or higher) of the conjugated diene substrates to the ester of an unsaturated carboxylic acid can almost always be accomplished within 20 hours, with 4 to 18 hours representing the more usual reaction time interval.

H. Conjugated Aliphatic Diene—As used throughout this disclosure, this term refers to a class of conjugated aliphatic linear dienes and cyclic diene substrates wherein the unsaturation in the substrate is only between adjacent carbon-to-carbon atoms. Illustrative of conjugated aliphatic dienes suitable as starting materials in this invention are those having from four to eight carbon atoms per molecule. The preferred aliphatic diene substrate is 1,3-butadiene; other conjugated open-chain diolefins, particularly 1,3-diolefins, that may be useful include 2-methyl-1,3-butadiene (isoprene), 2,3-dimethyl-1,3-butadiene, 2-chloro-1,3-butadiene (chloroprene), 1,3-pentadiene(piperylene), phenyl diolefins and 2,4-hexadiene.

I. Hydroxylated Coreactant—If it is desired to prepare unsaturated carboxylic acids, water must be present in the reaction mixture in sufficient concentration to satisfy the stoichiometry of equation 1. Where it is desired to prepare unsaturated aliphatic carboxylic acid esters an alcohol coreactant should be included in the reaction mixture with the conjugated aliphatic substrate, palladium catalyst and solvent. The alcohol may be a monohydric primary, secondary or tertiary alkanol of up to at least twelve carbon atoms, a substituted alcohol, a phenol, or a substituted phenol. Suitable examples include methanol, ethanol, isopropanol, dodecanol, phenol, tert-butanol, 2-cholorethanol, 2-ethylhexanol, methylcyclohexanol and the like.

Alternatively, the alkanol coreactant may be a polyol containing two or more hydroxyl groupings. Illustrative examples of suitable polyols include propylene glycol, neopentyl glycol, trimethylol propane and pentaerythritol.

J. Carbon Monoxide Environment—Insofar as can be determined, the best selectivities and conversions of the conjugated aliphatic dienes to aliphatic ester can be obtained within a reasonable reaction time by using a substantially carbon monoxide gaseous atmosphere. However, particularly in continuous operation the carbon monoxide may be used in conjunction with from about 0 to 30% by volume of one or more inert gases such as nitrogen, argon, neon and the like without experiencing a substantial decrease in yield and selectivity.

K. Selectivity—Selectivity is defined herein as the efficiency in catalyzing the desired diene dimerization, carbonylation reaction sequence relative to other undesired competing carbonylation reactions. It is expressed here as a percentile, and is calculated by determining the quantity of desired unsaturated fatty acid derivative formed, divided by the total amount of carbonylated products formed, and multiplying the quotient obtained by 100.

L. Yield—As defined here, yield is the efficiency in catalyzing the desired diene dimerization, carbonylation reaction relative to other undesired reactions. In this instance diene dimerization, carbonylation is the desired conversion. Yield is expressed as a percentile, and is calculated by determining the amount of desired unsaturated carboxylic acid or acid derivative formed, divided by the amount of conjugated aliphatic diene charged and multiplying the quotient obtained by 100.

M. By-Products—As far as can be determined, without limiting the invention thereby, the one-step dimerization, carbonylation of conjugated diene substrates leads primarily to the formation of only two classes of by-products. These by-products, formed only in minor amounts arise from (a) oligomerization of the conjugated diene to form a higher molecular weight polyene, and (b) carbonylation of the conjugated diene, without diene dimerization. Where 1,3-butadiene is the substrate, these by-products are principally 4-vinyl-1-cyclohexene, 1,3,7-octatriene and 3-pentenoic acid or its ester derivatives.

For runs made under various experimental conditions, the extent of by-product formation is listed in the following tables under percent selectivity and total ester/total polyene ratio.

These by-products may be separated from the desired unsaturated carboxylic acids and their esters by the usual chemical or physical techniques.

N. Identification Procedures—Where applicable, the products of this invention are identified by one or more of the following analytical procedures-gas chromatography (GC), infrared (IR) elemental analysis and nuclear magnetic resonance (NMR). Unless otherwise specified, all parts are by weight, all temperatures in degrees centigrade and all pressures in atmospheres (atm).

Having described the inventive process in general terms, the following examples are submitted to supply specific and illustrative embodiments.

EXAMPLE 1

The Synthesis of Isopropyl 3,8-Nonadienoate Ester From 1,3-Butadiene

To a degassed sample of 2-propanol (20ml) and 1,3-benzodioxole (40 ml) contained in a glass-lined reactor equipped for pressurizing, heating, cooling and means of agitation is added, under a nitrogen purge, palladium (II) acetate (0.30 gm, 1.34 mmole) and triphenylphosphine (0.70 gm). The reactor is sealed, purged with the CO, and butadiene (20 gm, 0.37 mole) injected in from a side-ampule. The reactor is further pressurized with carbon monoxide to 50 atmospheres and the mixture heated to 110° C., with agitation, for 18 hours. At the end of this time the reaction is terminated by rapid cooling. An analysis of the crude liquid product (83.1 gm) by GLC indicates the following selectivity and yield of ester: Isopropyl nonadienoate selectivity—86.4%; Yield of Isopropyl nonadienoate—62.2 mole percent.

It was noted that there is no solid precipitate and the liquid product shows 85% palladium recovery (Basis Pd Charged). The composition of the off-gas typically includes 89% carbon monoxide and about 2% butadiene.

EXAMPLES 2–10

The Dimerization/Carbonylation of Butadiene Catalyzed by Palladium Catalysts-Effect of Solvent The following examples summarized in Table 1, below served to demonstrate the selective dimerization/carbonylation of the 1,3-butadiene to isopropyl 3,8-nonadienoate catalyzed by the $Pd(OAc)_2$—$2PBu_3$ combination. The data provided a side-by-side comparison of the performance of this catalyst in absence of certain heterocyclic and phosphorus-containing solvents. The first 8 entries illustrate the use of heterocyclic compounds containing oxygen, nitrogen and sulfur hereroatoms such as furans and thiophenes, as well as mixed O—N— and O—S—heterocyclics and N,P-containing solvents like hexamethylphosphoramide. The last entry in the Table is the baseline case where 2-propanol is present in large excess and is the primary solvent. It is clearly evident that the ester yield and selectivity are materially less compared to use of solvents of the invention.

One should particularly note the increased 3,8-nonadienoate ester yield basis butadiene charged (see column 5). In column 6 there is noted through use of solvents of the invention improved selectivity to the desired linear $C_9$-acid ester. In column 8 there is noted greater catalyst stability as measured by the percentage palladium remaining in solution after completion of the synthesis. Lastly, from column 7 there is noted an improved ratio of carbonylation products (nonadienoate and pentenoate esters) relative to the less desirable diene oligomers (vinylcyclohexenes and noctatrienes) also present in the product mixed.

TABLE 1

| Example | Pd-Catalyst[a] Composition | Solvent | Coreactant | 3,8-Nonadienoate Yield (mole)%[c] | Ester[b] Sel.(wt%)[d] | Ester/Oligomer Ratio[e] | Recovered Pd(%)[f] |
|---|---|---|---|---|---|---|---|
| 2 | Pd(OAc)$_2$-2PBu$_3$ | Benzothiophene | 2-Propanol | 65.8 | 92.1 | 9.1 | 47 |
| 3 | Pd(OAc)$_2$-2PBu$_3$ | Tetrahydrothiophene | 2-Propanol | 63.6 | 88.8 | | 6.5 |
| 4 | Pd(OAc)$_2$-2PBu$_3$ | 1,3-Benzodioxole | 2-Propanol | 62.2 | 86.4 | 12.0 | 85 |
| 5 | Pd(OAc)$_2$-2PBu$_3$ | Dibenzofuran | 2-Propanol | 56.0 | 95.1 | 4.2 | |
| 6 | Pd(OAc)$_2$-2PBu$_3$ | 1,4-Thioxane | 2-Propanol | 68.0 | 90.2 | 14.7 | 68 |
| 7 | Pd(OAc)$_2$-2PBu$_3$ | p-Dioxane | 2-Propanol | 42.9 | 95.2 | | 95 |
| 8 | Pd(OAc)$_2$-2PBu$_3$ | Isoxazole | 2-Propanol | 44.5 | 98.3 | 2.97 | 72 |
| 9 | Pd(OAc)$_2$-2PBu$_3$ | Hexamethyl Phosphoramide | 2-Propanol | 28.7 | 95.2 | 2.33 | 83 |
| 10 | Pd(OAc)$_2$-2PBu$_3$ | None | 2-Propanol | 47 | 83.6 | 3.8 | 28 |

[a]Charge mixture: 1.34 mmole Pd(OAc)$_2$; 0.37 mole C$_4$H$_6$; 60 ml solvent/2-propanol (2:1)
[b]Carbonylation conditions: 110° C.; 48 atm initial pressure; 18 hr.
[c]Isopropyl 3,8-nonadienoate yield basis butadiene charged, estimated by GLC.
[d]Selectivity basis: Isopropyl 3,8-nonadienoate yield as a function of total C$_5$ + C$_9$ acid ester.
[e]Ratio basis: total C$_5$ + C$_9$ acid ester/total C$_8$-oligomer fraction in the crude product.
[f]Percentage Pd remaining in solution after butadiene carbonylation basis Pd originally charged.

As the numerous examples and preceding discussion have documented, numerous advantages accrue from the practice of this invention both in its compositional and process aspects. For example, ligand stabilized palladium catalysts are provided which are useful as catalysts for the one-step dimerization, carbonylation of aliphatic conjugated dienes to their unsaturated carboxylic acid/ester derivatives. Furthermore, it is disclosed that the performances of these catalysts, particularly their activity, stability and selectivity are significantly improved through the addition of certain classes of solvents, defined herein, and that in the presence of said solvents, multiple syntheses of desired ester may be readily effected using the same palladium catalyst sample without unacceptable loss of activity or the formation of insoluable palladium species.

Finally the invention is quite advantageous in that numerous substitutions, modifications and changes can be made without departing from the inventive concept. However the scope of the subject invention can best be understood by examining the claims which follow, read in conjunction with the preceding specifications.

What is claimed:

1. The process of providing unsaturated carboxylic fatty acids and their ester derivatives from aliphatic conjugated diene substrates containing from 4 to 8 carbon atoms which comprises the steps of:
   (a) admixing each two moles of said aliphatic conjugated diene with a three component mixture consisting of:
      (i) at least a catalytic quantity of a palladium catalyst consisting of one or more palladium salts in combination with one or more tertiary phosphorus-containing donor ligands;
      (ii) at least a mole equivalent of hydroxylated co-reactant selected from the group consisting of water or an aliphatic alkanol containing 1 to 12 carbon atoms; and
      (iii) A-S-heterocyclic solvent to form a reaction mixture;
   (b) Pressurizing said reaction mixture with sufficient carbon monoxide to satisfy the stoichiometry of the carbonylation reaction;
   (c) Heating said pressurized reaction mixture to temperatures of from 30° to 150° C. until substantial formation of desired unsaturated aliphatic carboxylic acid derivatives is achieved.

2. The process of claim 1 wherein the aliphatic conjugated diene substrate is 1,3-butadiene.

3. The process of claim 1 wherein the palladium salt is selected from the group consisting of palladium salts consisting of palladium(II) acetate, palladium(II) nitrate, palladium(II) sulfate and palladium (II) acetylacetonate.

4. The process of claim 1 wherein said solvent is 1,3-benzodioxole.

5. The process of claim 1 wherein said solvent is benzothiophene.

6. The process of claim 1 wherein said solvent is 1,4-thioxane.

7. The process of claim 1 wherein said aliphatic alkanol is selected from the group consisting of methanol, ethanol, isopropanol and t-butanol.

8. The process of claim 1 herein said hydroxylated coreactant is water.

9. A homogeneous recyclable palladium catalyst complex capable of concurrently dimerizing and carbonylating conjugated diene substrates contain from 4 to 8 carbon atoms, said catalyst complex consisting essentially of:
   (a) At least one palladium salt selected from the group consisting of palladium(II) acetate, palladium(II) formate, palladium(II) propionate, palladium(II) nitrate, palladium(II) sulfate, palladium(II) acetylacetonate, palladium(II) octanoate and palladium(II) chloride;
   (b) At least one Group VB tertiary donor ligand selected from the group consisting of triphenylphosphine, tri-n-ethylphosphine, tri-p-tolylphosphine, tricyclohexylphosphine and trioctylphosphine; and
   (c) A S-heterocyclic solvent.

* * * * *